Feb. 18, 1941.  W. B. HELMICK  2,232,604
ANIMAL TRAP
Filed May 16, 1940   2 Sheets-Sheet 1

Inventor
W. B. Helmick

Patented Feb. 18, 1941

2,232,604

UNITED STATES PATENT OFFICE 2,232,604

ANIMAL TRAP

Worley B. Helmick, Terra Alta, W. Va.

Application May 16, 1940, Serial No. 335,601

7 Claims. (Cl. 43—61)

This invention relates to an improved animal or rodent trap which is constructed and designed to trap an animal or rodent without injury to the animal or rodent entrapped and which may be used either with or without a bait.

It is a primary aim of the invention to provide a trap of simple construction capable of being economically manufactured and sold and which is composed of few parts having a simple operating mechanism rendering the trap efficient and practical in various uses to which it is adapted.

Still another object of the invention is to provide a trap of elongated shape adapted to be located in runways of animals or rodents and to be actuated by an animal passing therethrough for closing doors at each end of the trap for entrapping the rodent or animal therein.

Still another aim of the invention is to provide a trap having open ends and top portions adapted to be closed by swingably mounted doors actuated by gravity when released by an animal or rodent actuating a treadle mounted within the trap, which doors automatically lock when moved to a closed position, to thereby provide a trap which is actuated to close by gravity and without the use of springs and which may be readily set.

Other objects and advantages of the invention will hereinafter become more fully apparent from the following description of the drawings, which illustrate a preferred embodiment thereof, and wherein.

Figure 1:
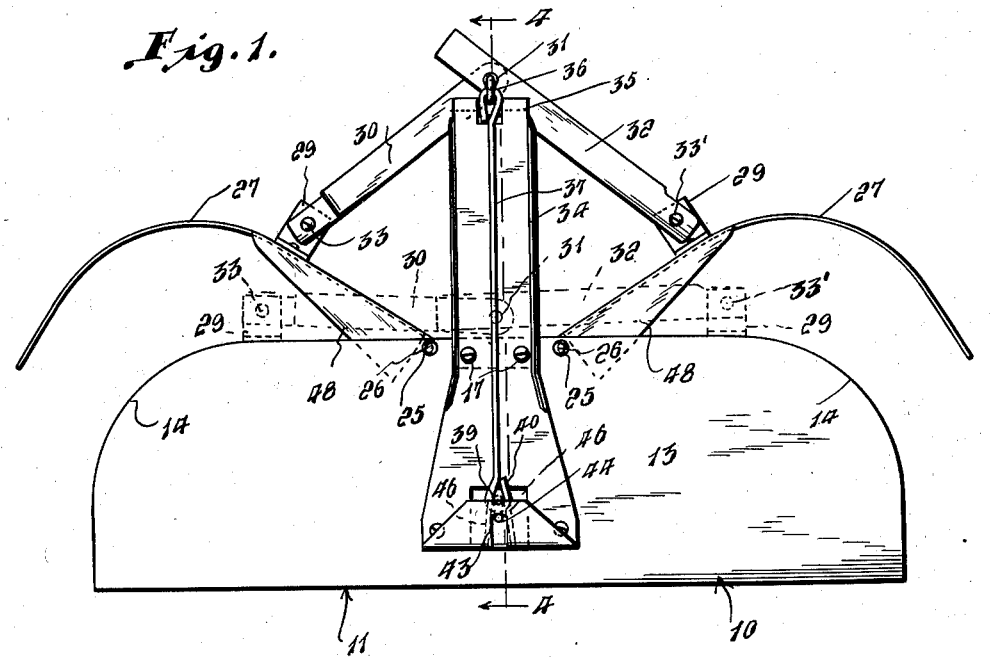
Figure 1 is a side elevational view showing the trap in a set position.
Figure 2:
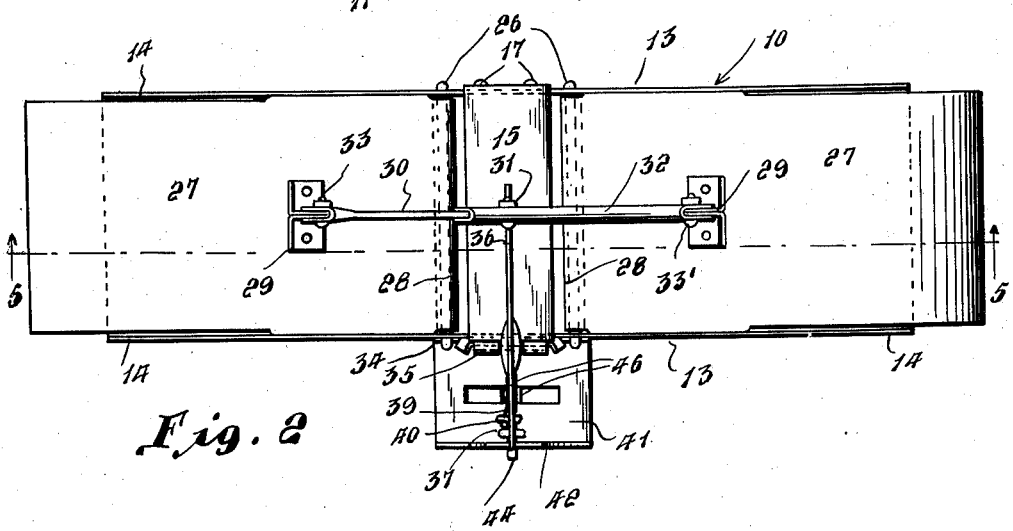
Figure 2 is a top plan view of the same.

Referring more particularly to the drawings, wherein like reference characters designate like or corresponding parts throughout the different views, 10 designates generally a trap constructed in accordance with the invention including a trap body 11, forming an elongated runway, having an open top and open ends. The trap body 11 comprises an elongated bottom or platform 12 provided with integral upset side walls 13 provided with rounded end portions 14, as best seen in Figure 1. The upper edges of the side walls 13, intermediate of their ends, are connected by means of a plate 15 having downturned flange ends 16 which are secured to the side walls 13 by fastenings 17.

A shaft 18 extends transversely through the body portion 11, intermediate of its ends, and is journaled in the side walls 13 by means of which it is supported above and adjacent to the bottom or platform 12. The shaft 18 is provided with a looped or enlarged intermediate portion 19 to which is secured a plate 20 by means of a fastening 21. The plate 20 is also provided with looped portions 22 at its ends which engage around the shaft 18. The shaft 18 and the plate 20 combine to form a pivotally mounted treadle 23 which is adapted to be rocked in either direction by an animal stepping thereon or otherwise contacting the treadle for releasing means for closing the trap 10, as will hereinafter become apparent. One end of the shaft 18 is provided with an offset or crank shaped end, which is disposed on the outer side of the body portion 11 to form a detent 24.

Figure 5:
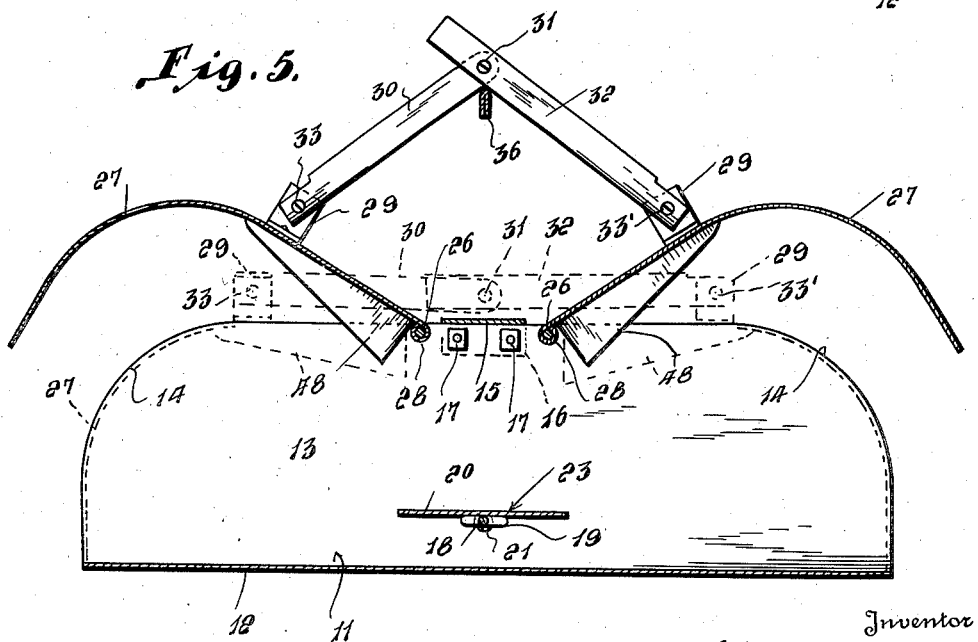
Figure 5 is a longitudinal vertical sectional view taken substantially along the plane of the line 5—5 of Figure 2, and showing the trap in a set position, in full lines, and in a released, closed position, in dotted lines.

The side walls 13 are provided with spaced, alined pairs of openings 25, adjacent the upper edges thereof and at either side of the plate 15 to journal the transversely disposed, substantially parallel shafts 26, the ends of which are loosely mounted in the openings 25. A pair of corresponding closures or doors 27 are provided with adjacent looped ends 28 which engage around and are secured to the shafts 26, between the walls 13. The closures or doors 27, as best seen in Figures 1 and 5, are curved downwardly at their outer free ends to correspond to the curved portions 14 of the walls 13 so that when the doors 27 are in a closed position, as seen in dotted lines in Figure 5, they will be disposed between the edges of the walls 13 to close the ends of the trap body 11 and the top portion thereof to adjacent the plate 15. The doors or closures 27, intermediate of their ends, are provided with the upwardly projecting apertured ears 29. A link 30 is pivotally mounted at one end by a pin 31 in a channeled shaped link 32, adjacent one end thereof. The opposite end of the link 30 is pivotally connected at 33 to one of the ears 29 and the opposite end of the link 32 is pivotally connected at 33' to the other ear 29 for connecting the closures or doors 27.

Figure 4:
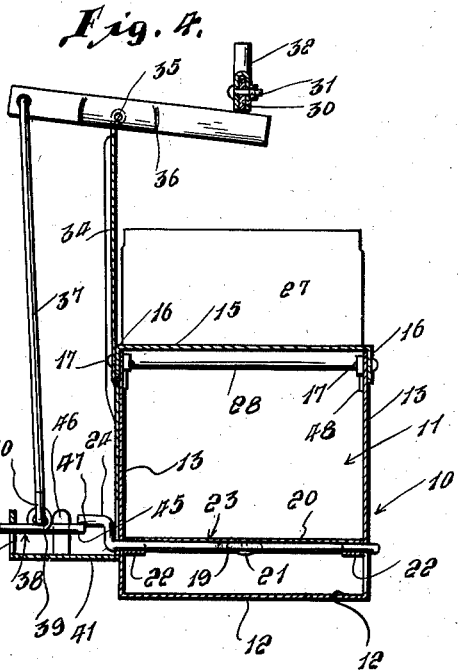
Figure 4 is a transverse vertical sectional view taken substantially along the plane of the line 4—4 of Figure 1.

As best seen in Figure 1, the standard 34 is fastened adjacent one end thereof to the outer side of one of the walls 13 and has an upper end projecting above the trap body 11 and in which is mounted a rod 35 to which is pivotally connected the rocker arm or lever 36. The rocker arm 36 is pivotally mounted intermediate of its ends and transversely of the trap body 11 with one end extending inwardly thereof and its opposite end projecting outwardly therefrom. A hanger 37 is pivotally connected at one end to the outer end of the rocker arm 36. A rod or crosshead 38 is provided with a loop, intermediate of its ends, designated 39, which is pivotally connected to the looped lower end 40 of the hanger 37. The standard 34, at its lower end, is provided with an outwardly projecting extension 41 having an upset flange 42, at its outer end, which is provided with a perpendicular slot 43 in which is disposed the end 44 of the crosshead 38. The opposite end 45 of the crosshead 38 is disposed between a pair of upwardly projecting fingers 46 which are secured to the extension 41. The end 45 is adapted to engage beneath a flattened portion 47 of the detent 24 when the treadle 23 is in substantially a horizontal position, as best seen in Figure 4, to support the inner end of the rocker arm 36 in an elevated, substantially horizontal position. A portion of the flange 42, above its slot 43 combines with the flattened portion 47 to hold the crosshead 38 in substantially a horizontal position as the fingers 46 engage the end 45 to prevent the crosshead 38 from swinging laterally. The closures 27 are held in a raised, open position by means of the inner end of the rocker arm 36 which engages the links 30 and 32 beneath their pivot 31. Closures 27, adjacent their secured ends are provided with depending flanges 48 at their side edges which engage the inner sides of the walls 13 for guiding the closures 27 during their movement from an open position, as seen in full lines in Figures 5, to a closed position, as seen in dotted lines in Figure 5.

Figure 3:
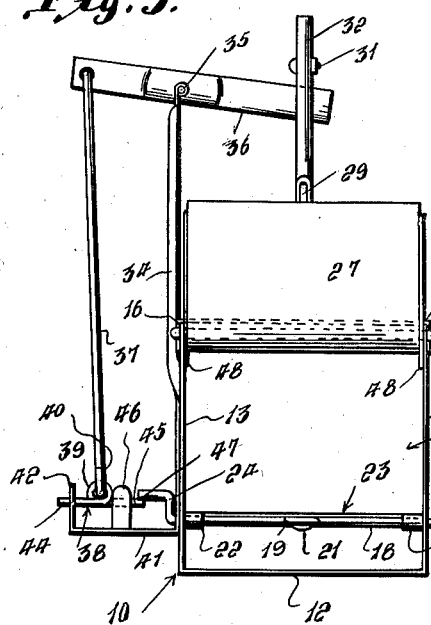
Figure 3 is an end view in elevation of the same.

Assuming the trap 10 to be set, as seen in Figure 1, the ends thereof will be opened forming a continuous passage therethrough so that the trap may be set in a runway of animals or rodents. Due to the fact that the ends and top portions of the trap 10 are open an animal or rodent will more readily enter the trap due to the fact that it can see an open outlet at the opposite end and in passing therethrough will step on or otherwise strike the treadle 23 to rock it in either direction for releasing the detent 24 from the end 45 which will swing upwardly, due to the weight on the inner end of the rocker arm 36 and thereby release the crosshead 38 and the rocker arm 36 so that the closures 27, through gravity, will swing to their closed positions. Closures 27, while moving to their closed positions, will slide slightly toward the ends of the trap body 11 due to the fact that the openings 25 are substantially larger than the shafts 26 to thereby permit the pivot 31 to swing past the dead center of the pivots 33 and 33' to a point slightly below the plane of said pivots, as illustrated in dotted lines in Figure 5 to thus lock the closures 27 in a closed position. To release the closures 27, it is necessary to pull upwardly on the links 30 and 32 at their pivot 31 so that the closures 27 cannot be opened from within the trap 10. To reset the trap, the closures 27 are raised by pulling upwardly on the links at their pivot 31 after which the hanger 37 is pulled downwardly to move the inner end of the rocker arm 36 up into position beneath the pivot 31. The crosshead 38 is then positioned, as seen in Figure 3, and as heretofore described, after which the treadle 23 is moved to a horizontal position so that the detent 24 will engage end 45 to again position the parts of the trap 10 in a set position.

Various modifications and changes are contemplated and may obviously be resorted to as only a preferred embodiment of the invention has been illustrated and described.

I claim as my invention:

1. An animal trap comprising a platform having upset side walls extending from end to end thereof, closure members pivotally mounted at their adjacent ends, in said side walls, adjacent their upper edges and intermediate of their ends, said closure members projecting outwardly and downwardly relatively to each other forming closures for the open top and end of the trap, a pair of pivotally connected links, said links having free ends pivotally connected to corresponding portions of said closures, a lever pivotally mounted on said trap, intermediate of its ends, and disposed above and between said closures, a hanger depending from one end of said lever and provided with an extension at its lower end, a treadle pivotally mounted in the trap above the platform, a pin for supporting said treadle, the ends of said pin being journaled in said side walls, one end of said pin being provided with an offset extension for engaging an extension on the lower end of said hanger for supporting said lever in substantially a horizontal position, the opposite end of said lever being positioned to engage beneath the pivotally connected ends of said links for supporting the closures in an elevated position, and the extension of said hanger being releasable from the extension of the pin by a rocking movement of the treadle for releasing the lever and links to permit the closures to swing downwardly to a closed position.

2. An animal trap comprising a platform having upset side walls, a shaft extending through said trap, intermediate of its ends and journaled in said side walls, a treadle fixed to said shaft and disposed within the trap above said platform, one end of said shaft having an offset extension forming a detent, said side walls, adjacent their upper edges and intermediate of their ends, having spaced pairs of alined openings, shafts loosely mounted adjacent their ends in said pairs of openings, closure members secured at their adjacent ends to said shafts and pivotally mounted thereby for normally closing the top and ends of the trap, said closures having upwardly projecting ears, intermediate of their ends, a link pivotally connected at one end to each of said ears, said links being pivotally connected at their opposite, adjacent ends, a bracket rising from a side of said trap, a lever pivotally mounted on the upper end of said bracket intermediate of its ends, a hanger depending from one end of said lever and provided with an extension at its lower end for engaging said detent, when the treadle is in substantially a horizontal position, for supporting the opposite end of the lever in substantially a horizontal position, and the pivotally connected ends of said links being supported by the last mentioned end of said lever for holding the closures in a raised, open position, said closures being releasable by a rocking movement of the treadle.

3. A trap as in claim 2, the openings in the side walls for loosely engaging said shafts providing a limited sliding movement of said closures to permit the pivotally connected ends of said links to swing past a dead center position, when the closures swing to a closed position, for locking the closures in a closed position.

4. A trap as in claim 2, said end walls having arcuately shaped ends, and said closures being arcuately shaped to close the openings in the ends and top of the trap.

5. An animal trap comprising an elongated trap body having open ends and an open top portion, pivotally mounted closures for closing the ends and top portion of said trap body, pivotally connected links for pivotally connecting said closures in spaced apart relationship to their pivotally mounted ends, a rocker arm pivotally mounted above the trap body for engaging the pivotally connected, adjacent ends of said links for supporting said closures in an elevated, open position, a treadle pivotally mounted in said trap body and provided with a detent projecting therefrom and offset relatively to the treadle, and trigger means associated with said rocker arm for engaging said detent for supporting the rocker arm in substantially a horizontal position, said trigger means being releasable by a rocking movement of the treadle and detent for releasing the rocker arm to release said links to permit the closures to swing to a closed position.

6. A trap as in claim 5, said closures having a limited sliding movement longitudinally of the trap body to permit the pivoted, adjacent ends of the links to swing past a dead center position as the closures are swinging to a closed position for locking the closures in a closed position.

7. A trap as in claim 5, comprising a standard secured to a side of the trap body and extending upwardly therefrom for pivotally mounting said rocker arm, said standard, at its lower end, having an outwardly projecting extension provided with an upset flange having a perpendicular slot formed therein, said trigger means including a hanger pivotally connected to one end of said rocker arm and having a crossbar pivotally connected to its lower end, one end of said crossbar being disposed to engage said detent, and the opposite end of the crossbar being disposed in said slot and in engagement with the upper end thereof to retain the crossbar in substantially a horizontal position until released by movement of the detent.

WORLEY B. HELMICK.